United States Patent
Blunt et al.

(10) Patent No.: US 7,474,257 B2
(45) Date of Patent: Jan. 6, 2009

(54) MULTISTATIC ADAPTIVE PULSE COMPRESSION METHOD AND SYSTEM

(75) Inventors: Shannon D Blunt, Shawnee, KS (US); Karl R Gerlach, Chesapeake Beach, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 149 days.

(21) Appl. No.: 11/268,755

(22) Filed: Nov. 7, 2005

(65) Prior Publication Data

US 2006/0097909 A1    May 11, 2006

Related U.S. Application Data

(60) Provisional application No. 60/626,502, filed on Nov. 8, 2004.

(51) Int. Cl.
G01S 13/00 (2006.01)
G01S 13/08 (2006.01)
(52) U.S. Cl. .................. 342/159; 342/202; 342/134
(58) Field of Classification Search .......... 342/159, 342/202
See application file for complete search history.

(56) References Cited

U.S. PATENT DOCUMENTS

| | | | | |
|---|---|---|---|---|
| 5,945,940 A | * | 8/1999 | Cuomo | 342/90 |
| 6,061,589 A | * | 5/2000 | Bridges et al. | 600/430 |
| 6,067,043 A | * | 5/2000 | Faure et al. | 342/174 |
| 6,252,540 B1 | * | 6/2001 | Hale et al. | 342/159 |
| 6,469,662 B2 | * | 10/2002 | Tullsson | 342/195 |
| 6,531,976 B1 | * | 3/2003 | Yu | 342/16 |
| 6,704,438 B1 | * | 3/2004 | Alexandru | 382/128 |
| 6,833,808 B2 | * | 12/2004 | Rees et al. | 342/159 |
| 6,879,281 B2 | * | 4/2005 | Gresham et al. | 342/70 |
| 6,940,450 B2 | | 9/2005 | Blunt et al. | |

(Continued)

OTHER PUBLICATIONS

L, O'Carroll, D.H. Davies, C.J. Smyth, J.H. Dripps, and P.M. Grant, "A study of auto- and cross-ambiguity surface performance for discretely coded wavefames". *IEE Proc. F. Commun. Radar and Signal Process.*, V. 137, No. 5, pp. 362-370, Oct. 1990.

(Continued)

*Primary Examiner*—Thomas H Tarcza
*Assistant Examiner*—Harry Liu
(74) *Attorney, Agent, or Firm*—John J. Karasek; L. George Legg

(57) ABSTRACT

A radar receiver system includes a receiver, a processor, and a detector. The processor is programmed with a Multistatic Adaptive Pulse Compression (MAPC) algorithm for estimating adaptively a pulse compression filter, for each range cell of a plurality of range cells, and for each of a plurality of radar return signals, to remove interference between the radar return signals. MAPC may also include reiterative minimum mean-square error estimation for applying to each of the range cells in order to adaptively estimate a unique pulse compression filter for each cell. MAPC adaptively mitigates the masking problem that results from the autocorrelation of a waveform which produces range sidelobes scaled by the target amplitudes as well as the cross-correlation between waveforms. MAPC can also be applied when only 1 or some subset of the available illuminated radar range profiles are desired, with undesired information then discarded.

3 Claims, 4 Drawing Sheets

U.S. PATENT DOCUMENTS

| | | | | |
|---|---|---|---|---|
| 7,151,484 | B2* | 12/2006 | Shinonaga et al. | 342/204 |
| 2005/0179585 | A1* | 8/2005 | Walker et al. | 342/134 |
| 2006/0140249 | A1* | 6/2006 | Kohno | 375/130 |

OTHER PUBLICATIONS

C.J. Nunn and L.R. Weich, "Multi-parameter local optimization for the design of superior matched filter polyphase pulse compression codes", *IEEE. Intl. Radar Cont.* pp. 435-440, (2000).

* cited by examiner

MULTISTATIC ADAPTIVE PULSE COMPRESSION METHOD AND SYSTEM

CROSS-REFERENCE TO RELATED APPLICATIONS

The present application claims the benefit of the priority filing date of provisional patent application No. 60/626,502, filed Nov. 8, 2004, incorporated herein by reference.

BACKGROUND OF THE INVENTION

The present invention relates to radar signal processing. More particularly, the present invention relates to the multistatic adaptive pulse compression processing of radar signals.

The increased desire for ever greater sensor coverage inevitably results in proximate radars overlapping ( at least partially) their respective operating frequency bands and as such are sources of mutual interference. This problem is exacerbated by the allocation of portions of the frequency spectrum previously allocated for radar to wireless communications. It is therefore desirable to provide concurrent, shared-spectrum radar operation in order to mitigate mutual interference, as well as to exploit the potential benefits that such an arrangement would provide, including aspect angle diversity, greater area coverage with shorter revisit times, and anti-stealth sensing capability.

It is well known that two or more radars operating in relatively close proximity, at the same time, and in the same spectrum will interfere with one another—often to the point of achieving complete RF fratricide. This is because it is impossible to generate waveforms that are orthogonal to one another at all possible respective delays and Doppler frequency shifts. The result is that a relatively large target return associated with one of the received signals can mask target returns from the other received signals.

A significant amount of work has been done to design sets of waveforms/matched filter pairs that possess suitable ambiguity and cross-ambiguity characteristics. Representative approaches are described in "A study of auto- and cross-ambiguity surface performance for discretely coded waveforms", L. O Carroll, D. H. Davies, C. J. Smyth, J. H. Dripps, and P. M. Grant, *IEE Proc. F; Commun., Radar, and Signal Process.*, 137, No. 5, pp. 362-370, October 1990, and "Multi-parameter local optimization for the design of superior matched filter polyphase pulse compression codes", C. J. Nunn and L. R. Welch, *IEEE Intl. Radar Conf*, pp. 435-440, (2000). The subject waveforms are designed such that the overall ambiguity ( i.e. range sidelobe levels and cross-correlations) is minimized on average over all delay/Doppler shifts and cross-correlations. However, as long as the radar receivers rely on standard deterministic pulse compression techniques (matched filtering or Least-Squares based mismatched filtering), there remains the distinct possibility that a small target will be masked by large targets that may exist in nearby range cells (within the same range profile) or by large targets in another range profile from which the reflected signal arrives nearly coincident in time at the receiver and whose corresponding waveform possesses a non-negligible cross-correlation with the waveform associated with the small target of interest. The combination of range sidelobes and waveform cross-correlation can collectively be considered as multistatic interference.

Conceptually, in order to mitigate the masking problem, a receive filter for a particular waveform at a particular range cell must be closely matched to the given transmitted waveform-while also cancelling the interference from targets in nearby range cells (range sidelobes) as well as from target returns from other received signals (waveform cross-correlations). Hence, the receive filters must be adaptive to the actual received signals since the appropriate receive filter will be unique for each individual range cell associated with each received signal.

An approach for the monostatic radar case known as Reiterative Minimum Mean-Square Error (RMMSE) estimation, described in U.S. Pat. No. 6,940,450, issued Sep. 6, 2005 and incorporated herein by reference, is capable of accurately estimating the range profile illuminated by a radar by suppressing range sidelobes to the level of the noise floor. This is accomplished by adaptively estimating the appropriate receiver pulse compression filter to use for each individual range cell. Furthermore, the RMMSE algorithm, which has also been denoted as Adaptive Pulse Compression (APC) when applied to the radar pulse compression problem, has been shown to be robust to rather severe Doppler mismatch.

It would be desirable to provide an adaptive radar processing system that can resolve a radar target in the presence of multiple radar return signals occupying a shared frequency spectrum.

BRIEF SUMMARY OF THE INVENTION

According to the invention, a radar receiver system includes a receiver, a processor, and a detector. The processor is programmed with a Multistatic Adaptive Pulse Compression (MAPC) algorithm for estimating adaptively a pulse compression filter, for each range cell of a plurality of range cells, and for each of a plurality of radar return signals, to remove interference between the radar return signals. MAPC may also include reiterative minimum mean-square error estimation for applying to each of the range cells in order to adaptively estimate a unique pulse compression filter for each range cell. The invention also includes a method for applying the estimation algorithm.

MAPC enables the joint estimation of multiple independent range profiles. MAPC may also be used to estimate the profile of a single spatial region from multiple aspect angles or different portions of a single extended range profile made possible by transmitting a series of pulses, each modulated with a different waveform.

The MAPC algorithm adaptively mitigates the masking problem that results from the autocorrelation of a waveform which produces range sidelobes scaled by the target amplitudes as well as the cross-correlation between waveforms which is the primary reason that shared-spectrum multistatic radar has been infeasible in the past. In addition to complete multistatic operation (in which it is desired for each receiver, from the perspective of its unique aspect angles, to estimate the range profiles illuminated by all of the radars), the algorithm can also be applied when only 1 or some subset of the available illuminated radar range profiles are desired which involves the same implementation with the undesired information discarded afterwards.

The MAPC algorithm also has application in the areas of medical and seismic imaging when a received sensor return signal contains the superposition of multiple signals which are the reflections from objects illuminated by a set of different transmitted waveforms.

DETAILED DESCRIPTION OF THE INVENTION

Definitions: The term "convolution" means the process that yields the output response of an input to a linear time-invariant system, such as is described and defined in J. G. Proakis and D. G. Manolakis, *Digital Signal Processing: Principles, Algorithms, and Applications*, 3rd Ed., pp. 75-82, Prentice Hall: Upper Saddle River, N.J. (1996), incorporated herein by reference. The term "deconvolution" as used herein means the process that given the output of a system determines an unknown input signal to the system. See Id. at p. 355, incorporated herein by reference. The term "scatterer" means something in the path of a transmitted waveform that causes a significant reflection (relative to the noise) back to the receiver of the sensor.

Figure 1:
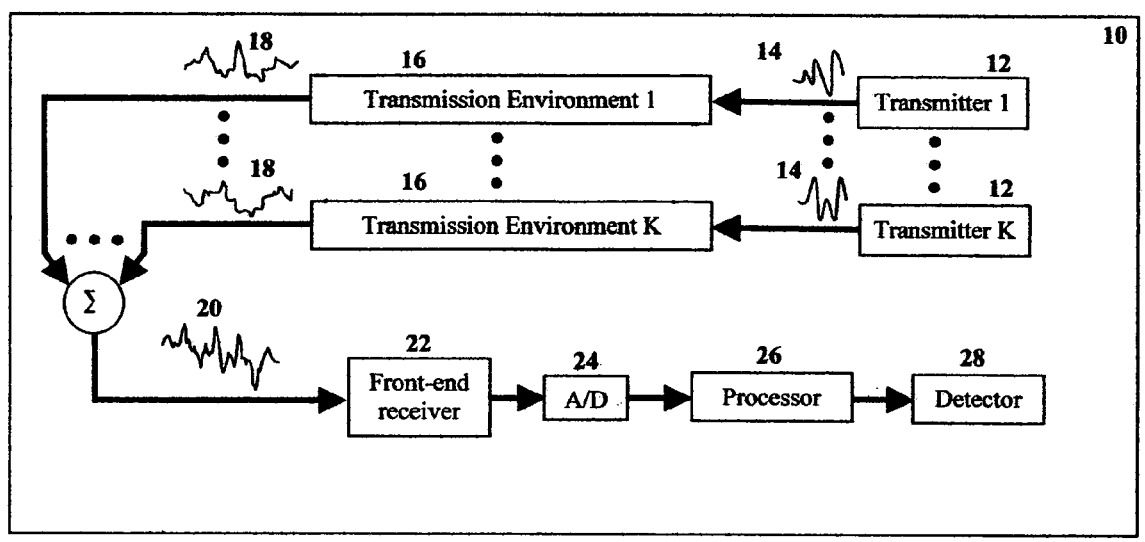
FIG. 1 is a schematic diagram of a Multistatic Adaptive Pulse Compression (MAPC) system according to the invention.

Referring now to FIG. 1, a multistatic adaptive pulse compression (MAPC) system 10 includes a set of K transmitters 12 for transmitting a set of K different phase or frequency modulated pulses (or waveforms) 14 that, upon interacting with their individual transmission environments' unknown impulse response 16 (to be estimated, as is described further below) each form a signal 18 that is a convolution of the respective waveform 14 and the respective impulse response 16, the superposition signal 20 resulting from the concurrent incidence of the K signals 18 at the receiver, an analog front-end receiver 22 for receiving the superposition signal 20, an optional analog-to-digital (A/D) converter 24, a processor 26 for processing analog or digital signals 20, and a detector 28. The processor 26 includes a MAPC algorithm, described as follows.

Consider K radars (designated individually as radar k, for k=1,2, ... ,K) that operate simultaneously in the same spectrum each with a distinct transmitted waveform. The discrete-time version of the $k^{th}$ radar's waveform is denoted as the column vector $s_k$ having length N. Note that without loss of generality the same processing is to be performed at each of the radar receivers; thus for this-development we consider only the $1^{st}$ radar. Each transmitted waveform $s_k$ is reflected by scatterers (which, if the transmitter possesses transmit beamforming capability, could lie in a mainbeam-illuminated region or a sidelobe-illuminated region) within the particular operating environment. At the $1^{st}$ radar (or in general for any of the K radars) the received signal is a superposition of signals resulting from the convolution of each waveform with its illuminated environment. The $l^{th}$ time sample of the superposition of K received radar return signals (which may or may not be after spatial receive beamforming in a given direction) is defined as $$y(l) = \sum_{k=1}^{K} x_k^T(l)s_k + v(l) \quad (1)$$

for l=0, ... ,L+N−2 the indices of the received signal samples of interest (used to estimate the L-length processing windows of the respective range profiles) where $x_k(l)=[x_k(l) \ x_k(l-1) \ ... \ x_k(l-N+1)]^T$ is the N-length vector of discrete range profile samples at delay l with which the discrete transmitted waveform $s_k$ convolves, v(l) is additive noise, and $(\bullet)^T$ is the transpose operation.

By collecting N samples of the received radar return signal (which may or may not be after spatial receive beamforming), the resulting signal model can be expressed as $$y(l) = \sum_{i=1}^{K} X_i^T(l)s_i + v(l) \quad (2)$$

where $y(l)=[y(l) \ y(l+N-1) \ ... \ y(l+N-1)]^T$ is an N-tuple of contiguous temporal samples of the received signal, $v(l)=[v(l) \ v(l+1) \ ... \ v(l+N-1)]^T$ is a vector of additive noise samples, and $X_i(l)=[x_i(l) \ x_i(l+1) \ ... \ x_i(l+N-1)]$ is an N×N matrix comprised of N-length sample-shifted snapshots (in the columns) of the $i^{th}$ range profile.

The standard matched filtering operation (described further below) dictates convolving the received radar return signal y(l) with the time-reversed complex conjugate of each of the transmitted waveforms in order to obtain estimates of the K respective range profiles (the particular realizations of which depend upon whether or not spatial beamforming has been applied and, if so, in which direction the beamformer is steered with respect to the angles-of-arrival of the set of superimposed received signals). The outputs of the matched filtering operation can be expressed in the digital domain as $$\hat{x}_{MF,k}(l) = s_k^H y(l) \quad (3)$$

for k=1,2, ... ,K and i=0,1, ... ,L−1. However, since ideal matched filtering assumes only a single received signal in noise, it is expected that the matched filter will perform poorly in the multistatic scenario, as the received signals will effectively jam one another.

To accommodate for multiple, simultaneously received signals in the same spectrum, the Multistatic Adaptive Pulse Compression (MAPC) algorithm replaces the matched filter $s_k$ in (3) with an RMMSE-based filter (described further below) which, for the $k^{th}$ radar's waveform and $l^{th}$ range gate, minimizes the MMSE cost function $$J_k(l) = E[|x_k(l) - w_k^H(l)y(l)|^2] \quad (4)$$

for k=1,2, ... ,K where E[●] denotes expectation. The solution to (4) takes the form $$w_k(l) = \hat{\rho}_k(l) \left( \sum_{i=1}^{K} C_i(l) + R \right)^{-1} s_k \quad (5)$$

for each k=1,2, ... ,K, where $\hat{\rho}_k(l)=|\hat{x}_k(l)|^2$ is the estimated power of $x_k(l)$ and $R=E[v(l) v^H(l)]$ is the temporal (range) noise covariance matrix. The matrix $C_i(l)$ is defined as $$C_i(l) = \sum_{n=-N+1}^{N-1} \hat{\rho}_i(l+n)s_{i,n}s_{i,n}^H \quad (6)$$

where $s_{i,n}$ contains the elements of the waveform $s_i$ shifted by n samples and the remainder is zero-filled. For example, $s_{i,2}=[0\ 0\ s_i(0)\dots s_i(N-3)]^T$ for n=2 and $s_{i,-2}=[s_i(2)\dots s_i(N-1)\ 0\ 0]^T$ for n=−2.

To employ (5) and (6) requires initial estimates of the K range profiles as well as knowledge of the noise covariance matrices R. Assuming the noise covariance is white Gaussian, R simplifies to $\sigma_v^2 I$, where I is the N×N identity matrix and $\sigma_v^2$ is the noise power which can be assumed known since internal thermal noise is known to dominate the external noise at microwave frequencies (where most radars operate). The initial estimates of the K range profiles can be obtained either by using standard matched filtering or, by assuming the prior power estimates of all of the range cells in (5) are equal and assuming the noise is negligible initially, applying the initialized MMSE filter $$\tilde{w}_k = \left(\sum_{i=1}^{K} \tilde{C}_i\right)^{-1} s_k \tag{7}$$

for k=1,2,...,K, where the matrix $\tilde{C}_i$ is defined as $$\tilde{C}_i = \sum_{n=-N+1}^{N-1} s_{i,n} s_{i,n}^H \tag{8}$$

The initial MMSE filters from (7) are range invariant and can therefore be pre-computed. After (7) is applied, as in (4) with $s_k$ replaced by $\tilde{w}_k$ for k=1,2,...,K, and the initial KL range cell complex amplitude estimates have been obtained, (5) is subsequently used to estimate the refined receive filters which are then re-applied to the received signal y(l) to obtain a more accurate estimate of the range cell complex amplitudes. The refined receive filters are better able to mitigate the masking effects caused by waveform cross-correlation and range sidelobes due to the fact that they are estimated based upon some a priori knowledge regarding the larger targets, which was obtained by a previous stage. The re-estimation of the individual receive filters and range cells is repeated for a pre-determined number of stages.

MMSE and RMMSE

Minimum Mean-Square Error (MMSE) estimation is a Bayesian estimation approach that employs prior information in order to improve estimation accuracy. The exact form that the prior information will take will be addressed shortly. First, however, the signal model must be constructed.

Matched filtering has been shown to maximize the received signal-to-noise ratio (SNR) in the presence of white Gaussian noise by convolving the transmitted signal with the received radar return signal. One can represent matched filtering in the digital domain as the filtering operation $$\hat{x}_{MF}(l) = s^H y(l), \tag{9}$$

where $\hat{x}_{MF}(l)$, for l=0,...,L−1, is the estimate of the $l^{th}$ delayed sample of the system impulse response, $s=[s_1\ s_2\ \dots\ s_N]^T$ is the length-N sampled version of the transmitted waveform, $y(l)=[y(l)\ y(l+1)\dots y(l+N-1)]^T$ is a vector of N contiguous samples of the received return signal, and $(\bullet)^H$ and $(\bullet)^T$ are the complex-conjugate transpose (or Hermitian) and transpose operations, respectively. Each individual sample of the return signal can be expressed as $$y(l) = x^T(l)s + v(l), \tag{10}$$

where $x(l)=[x(l)\ x(l-1)\dots x(l-N+1)]^T$ consists of N samples of the true system impulse response and v(l) is additive noise. The matched filter output can therefore be written as $$\hat{x}_{MF}(l) = s^H A^T(l)s + s^H v(l) \tag{11}$$

where $v(l)=[v(l)\ v(l+1)\dots v(l+N-1)]^T$ and $$A(l) = \begin{bmatrix} x(l) & x(l+1) & \cdots & x(l+N-1) \\ x(l-1) & x(l) & \ddots & \vdots \\ \vdots & \ddots & \ddots & x(l+1) \\ x(l-N+1) & \cdots & x(l-1) & x(l) \end{bmatrix} \tag{12}$$

is a collection of sample-shifted snapshots (in the columns) of the impulse response.

From (11), we see that the collection of N samples of the received return signal can be expressed as $$y(l) = A^T(l)s + v(l). \tag{13}$$

This is the received signal model used by the matched filter formulation. To develop the MMSE filter, the matched filter s in (11) is replaced with the MMSE filter, denoted w(l), in which the form of the MMSE filter is dependent upon the 2N−1 surrounding values of the impulse response value under consideration. Thereafter, the MMSE cost function $$J(l) = E[|x(l) - w^H(l)y(l)|^2] \tag{14}$$

is solved for each impulse response coefficient l=0,...,L−1, where E[●] denotes expectation. This is done by differentiating with respect to w*(l) and then setting the result to zero. The MMSE filter is found to take the form $$w(l) = (E[y(l)y^H(l)])^{-1} E[y(l)x^*(l)], \tag{15}$$

where $(\bullet)^*$ is the complex conjugate operation. After substituting for y(l) from (13) and assuming that the impulse response coefficients are, in general, uncorrelated with one another and are also uncorrelated with the noise, one obtains $$w(l) = \rho(l)(C(l) + R)^{-1} s, \tag{16}$$

where $\rho(l) = E[|x(l)|^2]$ is the expected power of x(l), and $R = E[v(l)\ v^H(l)]$ is the noise covariance matrix. On assuming neighboring coefficients are uncorrelated, the matrix C(l) is defined as $$C(l) = \sum_{n=-N+1}^{N-1} \hat{\rho}(l+n) s_n s_n^H \tag{17}$$

where $s_n$ contains the elements of the waveform s shifted by n samples and the remainder is zero-filled. For example, $s_2=[0\ 0\ s(0)\dots s(N-3)]^T$ for n=2 and $s_{-2}=[s(2)\dots s(N-1)\ 0\ 0]^T$ for n=−2.

Also, any prior information regarding the noise can be employed via the noise covariance matrix R. For instance, for a white noise assumption R is diagonal.

In its current state the MMSE filter is a function of the powers of the surrounding impulse response coefficients, which in practice are unavailable. This lack of prior knowledge can be taken into account by setting all the initial coefficient estimates equal. Therefore, the initial MMSE filter reduces to the form $$\tilde{w} \cong \tilde{C}^{-1} s \tag{18}$$

where the noise term is assumed negligible and $$\tilde{C}(l) = \sum_{n=-N+1}^{N-1} s_n s_n^H \quad (19)$$

is invariant to the sample delay l. The initial MMSE filter can therefore be pre-computed and then implemented in the same way as the traditional matched filter. The inclusion of the matrix $\tilde{C}$ serves to provide a "local" LS initial estimate.

Figure 2:
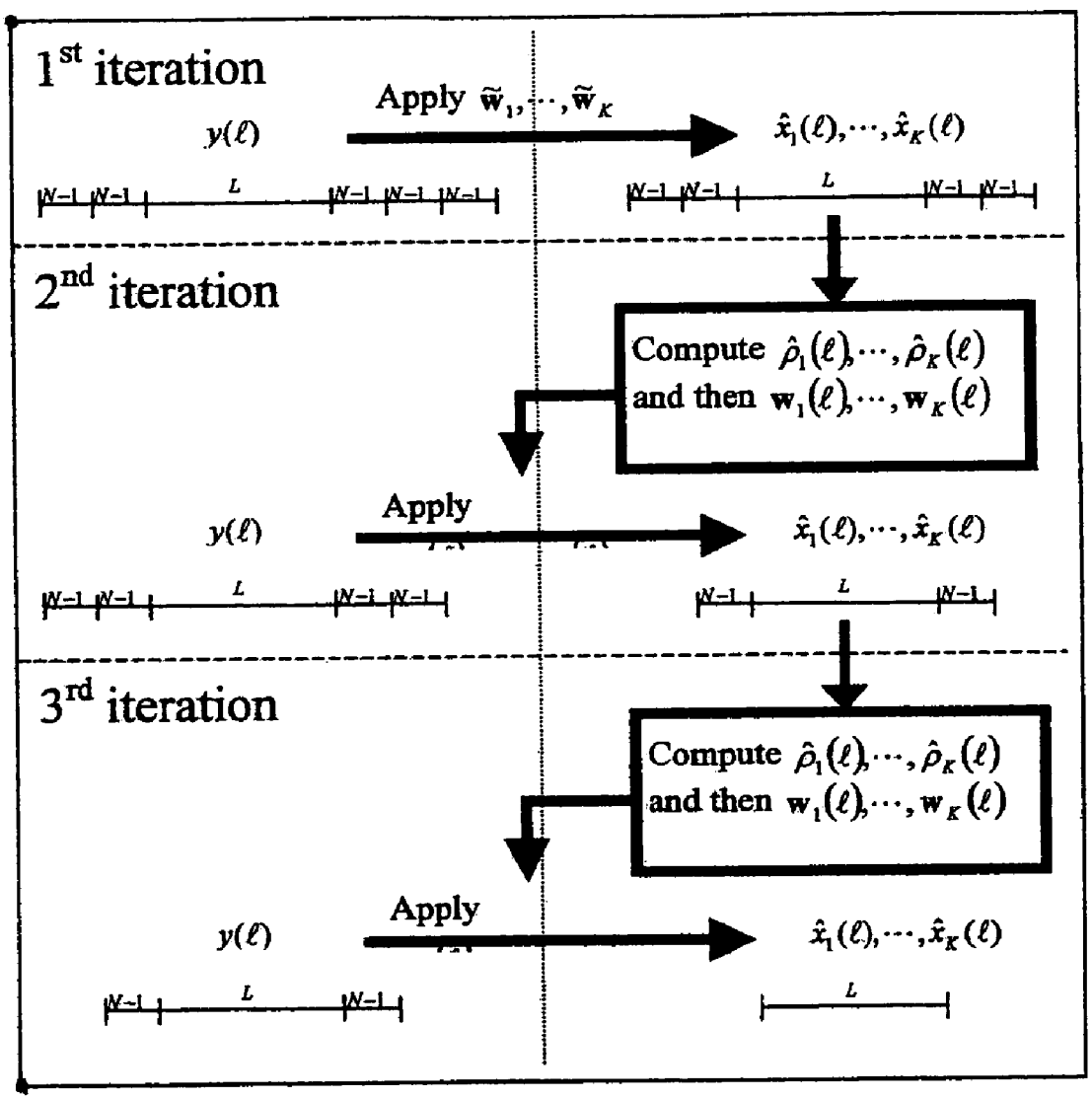
FIG. 2 is a block diagram of a 3-stage MAPC algorithm according to the invention.

FIG. 2 illustrates the MAPC algorithm for three stages. In general, the MAPC algorithm operates as follows:
1) Collect the L+(2M−1)(N−1) samples of the received return signal [y{−(M−1)(N−1)}, ..., y{−1}, y{0}, ..., y{L−1}, y{L}, ..., y{L−1+M(N−1)}], which comprise the Length—L data window along with the (M−1)(N−1) samples prior to the data window and the M(N−1) samples after the data window.
2) Apply the initial MMSE filters from (7) to obtain the K sets of initial impulse response estimates.
3) Compute the initial power estimates $\hat{\rho}_k(l)=|\hat{x}_k(l)|^2$ for l=−(M−1)(N−1), ..., L−1+(M−1)(N−1) and k=1, 2, ..., K which are used to compute the filters $w_k(l)$ k=1, 2, ..., K as in (5), which are then applied to y(l) to obtain K sets of revised impulse response estimates.
4) Repeat 2) and 3), changing the indices where appropriate, for a predetermined number of stages or until a desired sidelobe level is reached.

The initial estimates of the impulse response found by applying the MMSE filter is used as a priori information to reiterate the MMSE filters and improve performance. This is done by employing the MMSE filter formulation from (5) in which the respective powers of the impulse response coefficients are taken from the current estimates. Each reiteration stage will reduce the number of new coefficient estimates in each impulse response by 2(N−1). To counteract this, it is desirable to increase the size of the data window by 2M(N−1) samples, where M is the number of reiteration stages. Typically, however, L>>N so that this reduction in data window size is negligible.

It should also be noted that the non-singularity of the N×N matrix $(\Sigma_{i=1}^{K}C_i(l)+R)$ in (5) can be addressed by instituting a nominal level for which the estimated coefficients are not allowed to go below. An alternative to this would be to re-estimate only those coefficients that are above some threshold since the small-valued coefficients do not contain a detectable scatterer.

Referring now to (5) and (6), in another embodiment a stability factor a replaces the exponent in the term $\hat{\rho}_k(l)$ in (5) and (6) resulting in $$\hat{\rho}_k(l)=|\hat{x}_k(l)|^\alpha$$

The stability factor is used to keep the matrix $C_k(l)$ from becoming ill-conditioned when the received radar signals have a large dynamic range. Stability factor α preferably falls within $1 \leq \alpha \leq 1.7$. Similar to the adaptation step-size in closed loop algorithms, preferably α is initially set at the high end and allowed to decrease toward the low end by the final stage.

Simulation Results

Figure 3:
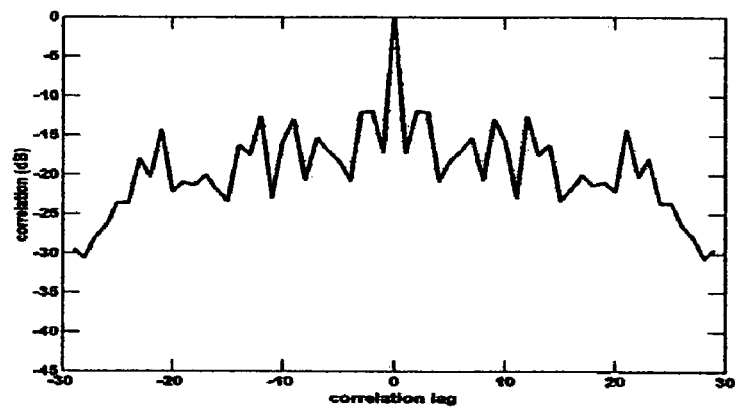
FIG. 3 is a graph showing the autocorrelation of a $1^{st}$ waveform according to the invention.
Figure 4:
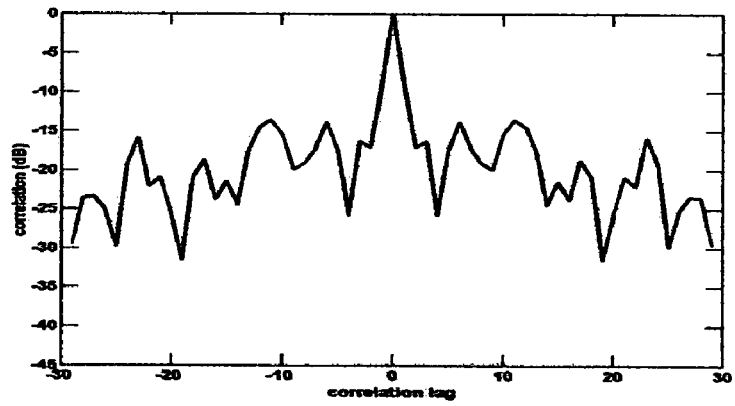
FIG. 4 is a graph showing the autocorrelation of a $2^{nd}$ waveform according to the invention.
Figure 5:
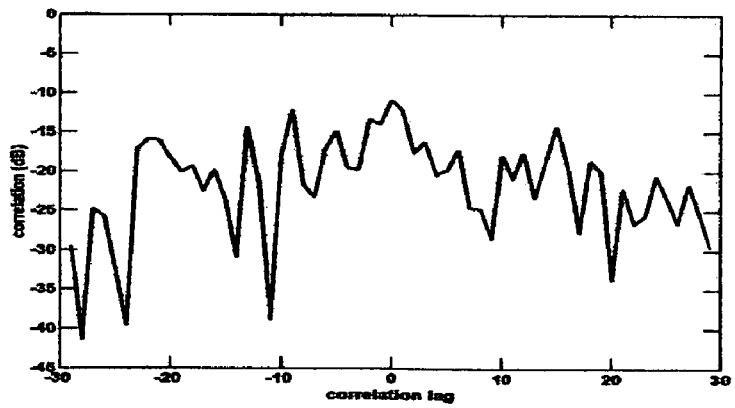
FIG. 5 is a graph showing the cross-correlation between the $1^{st}$ and $2^{nd}$ waveforms of FIGS. 3 and 4 according to the invention.

We consider the simultaneous reception of two random-phase waveforms of length N=30. The autocorrelations of the waveforms and their cross-correlation are depicted in FIGS. 3-5. The waveforms have normalized peak sidelobe levels of −12 dB and −13 dB, respectively, and their cross-correlation peaks at −11 dB.

Figure 6:
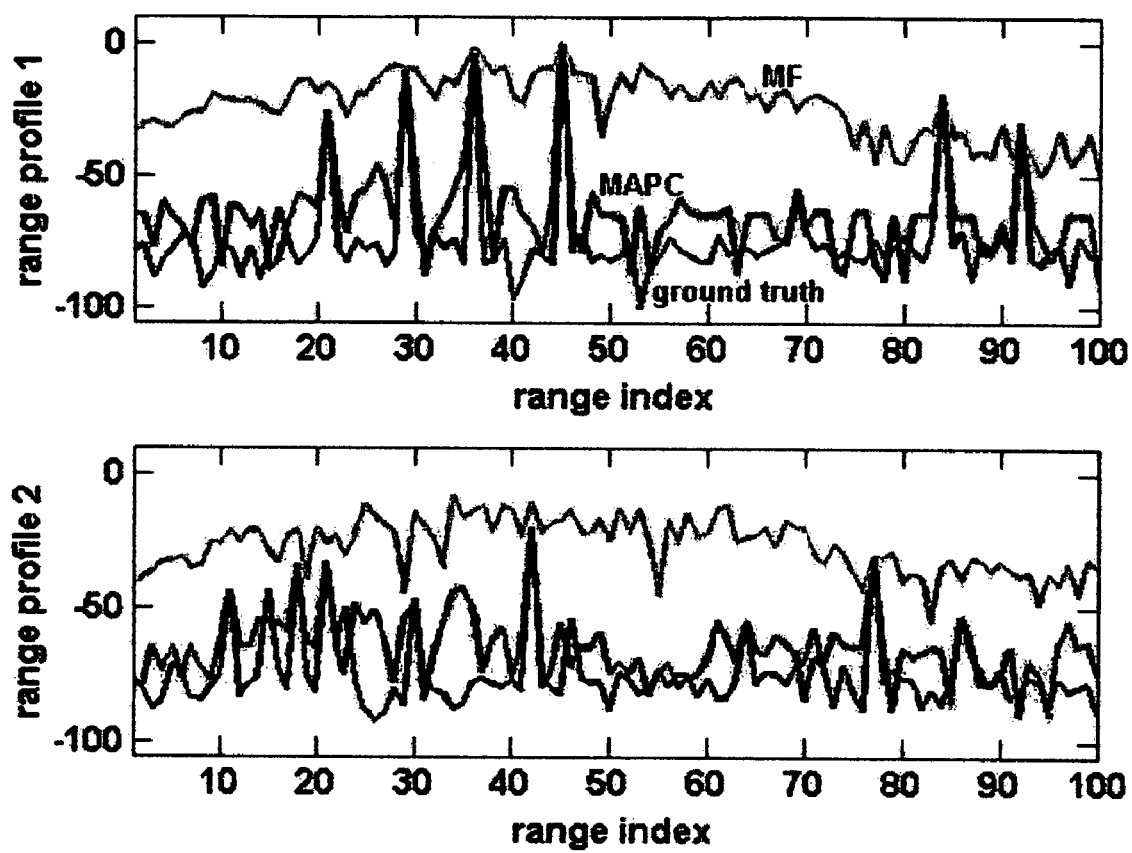
FIG. 6 shows matched filter (MF) and MAPC results for multistatic radar reception of 2 radar return signals.

As is presented in FIG. 6, the ground truth of the respective range profiles (represented by the black lines) is comprised of many closely spaced targets with highly disparate power levels and −60 dB noise (with respect to the largest target power). As expected, the matched filters perform poorly due to the combined effects of range sidelobes and waveform cross-correlation. The MAPC algorithm is employed with four stages and, for the given scenario, significantly suppresses both the range sidelobes and the cross-correlation interference. In terms of Mean-Square Error (MSE) performance, for the first range profile matched filtering attains an MSE of −16 dB while the MAPC algorithm achieves −52 dB, a 36 dB improvement.

What is claimed as new and desired to be protected by Letters Patent of the United States is:

1. A method for adaptively pulse compressing two or more concurrently received radar return signals occupying a same portion of a frequency spectrum, comprising:
  a) concurrently receiving said radar return signals as a single superpositioned radar signal, wherein each of said radar return signals includes a plurality of range cells; and
  b) estimating adaptively a pulse compression filter for each range cell of said plurality of range cells for each of said radar return signals, thereby removing interference between said radar return signals, wherein reiterative minimum mean-square error (RMMSE) estimation is applied to each of said range cells to adaptively estimate a unique pulse compression filter for each said cell, wherein a cost function
$J_k(l)=E[|x_k(l)-w_k^H(l)y(l)|^2]$ is minimized, where each of the number of radars K is individually designated as radar k, for k=1,2, ..., K that are operating simultaneously in the same spectrum with each said radar k having a distinct transmitted waveform $S_k$, where $$w_k(l) = \hat{\rho}_k(l)\left(\sum_{i=1}^{K}C_i(l) + R\right)^{-1} s_k$$

for each k, $\hat{\rho}_k(l)=|\hat{x}_k(l)|^\alpha$ is the compressed estimated power of $x_k(l)$ and $R=E[v(l) v^H(l)]$ is the temporal (range) noise covariance matrix, with $1 \leq \alpha \leq 1.7$, and the matrix $C_i(l)$ is defined as $$C_i(l) = \sum_{n=-N+1}^{N-1} \hat{\rho}_i(l+n)s_{i,n}s_{i,n}^H,$$

and wherein α is initially set at about 1.7 and decreased during processing to a final value of about 1.

2. A radar receiver system, comprising:
  a receiver;
  a processor programmed for estimating adaptively a pulse compression filter for each range cell of a plurality of range cells for each of a plurality of radar return signals to thereby remove interference between said radar return signals; and
  a target detector, wherein reiterative minimum mean-square error (RMMSE) estimation is applied to each of said range cells to adaptively estimate a unique pulse compression filter for each said cell, wherein a cost function $J_k(l)=E[|x_k(l)-w_k^H(l)y(l)|^2]$ is minimized, where each of the number of radars K is individually designated as radar k, for k=1,2, ..., K that are operating simultaneously in the same spectrum with each said radar k having a distinct transmitted waveform, $s_k$, where $$w_k(l) = \hat{\rho}_k(l)\left(\sum_{i=1}^{K} C_i(l) + R\right)^{-1} s_k$$

for each k, $\hat{\rho}_k(l)=|\hat{x}_k(l)|^\alpha$ is the estimated power of $x_k(l)$ and $R=E[v(l) v^H(l)]$ is the temporal (range) noise covariance matrix, with $1 \leq \alpha \leq 1.7$, and the matrix $C_i(l)$ is defined as $$C_i(l) = \sum_{n=-N+1}^{N-1} \hat{\rho}_i(l+n)s_{i,n}s_{i,n}^H,$$

and
wherein α is initially set at about 1.7 and decreased during processing to a final value of about 1.

3. A method for adaptively pulse compressing two or more concurrently received radar return signals occupying a same portion of a frequency spectrum, comprising:
  a) concurrently receiving and beamforming said radar return signals as a single superpositioned radar signal, wherein each of said radar return signals includes a plurality of range cells;
  b) minimizing a cost function $J_k(l)=E[|x_k(l)-w_k^H(l)y(l)|^2]$, where each of the number of radars K is individually designated as radar k, for k=1,2, ..., K that are operating simultaneously in the same spectrum with each said radar k having a distinct transmitted waveform, $s_k$, where $$w_k(l) = \hat{\rho}_k(l)\left(\sum_{i=1}^{K} C_i(l) + R\right)^{-1} s_k$$

for each k, $\hat{\rho}_k(l)=|\hat{x}_k(l)|^\alpha$ is the estimated power of $x_k(l)$ and $R=E[v(l) v^H(l)]$ is the temporal (range) noise covariance matrix, with $1 \leq \alpha \leq 1.7$, and the matrix $C_i(l)$ is defined as $$C_i(l) = \sum_{n=-N+1}^{N-1} \hat{\rho}_i(l+n)s_{i,n}s_{i,n}^H;$$

setting $$w_k(l) = \hat{\rho}_k(l)\left(\sum_{i=1}^{K} C_i(l) + R\right)^{-1} s_k$$

for k=1,2, ..., K, where the matrix $\tilde{C}_i$ is defined as $$C_i(l) = \sum_{n=-N+1}^{N-1} \hat{\rho}_i(l+n)s_{i,n}s_{i,n}^H;$$

c) applying $$w_k(l) = \hat{\rho}_k(l)\left(\sum_{i=1}^{K} C_i(l) + R\right)^{-1} s_k$$

to obtain estimated refined receive filters;
  d) applying said estimated refined receive filters to the radar return signal; and
  repeating b)-d) for a predetermined number of subsequent reiterative stages or until a desired range cell estimation accuracy is obtained, and wherein α is initially set at about 1.7 and decreased during processing to a final value of about 1.

* * * * *